May 17, 1960  R. F. O'BRIEN ET AL  2,936,685
CAMERA WALL AND OPTICAL MOUNT CONSTRUCTION
Filed Jan. 9, 1957  2 Sheets-Sheet 1

Robert F. O'Brien
Edgar S. Marvin
INVENTORS

BY

ATTORNEYS

May 17, 1960

R. F. O'BRIEN ET AL 2,936,685

CAMERA WALL AND OPTICAL MOUNT CONSTRUCTION

Filed Jan. 9, 1957

Robert F. O'Brien
Edgar S. Marvin
INVENTORS

BY

ATTORNEYS

United States Patent Office 2,936,685
Patented May 17, 1960

2,936,685
CAMERA WALL AND OPTICAL MOUNT CONSTRUCTION

Robert F. O'Brien and Edgar S. Marvin, Rochester, N.Y., assignors to Eastman Kodak Company, Rochester, N.Y., a corporation of New Jersey Application January 9, 1957, Serial No. 633,223

5 Claims. (Cl. 95—11)

This invention relates to photography and more particularly to a camera construction which includes a means for holding portions of the camera and portions of the optical systems accurately in place. In the past objectives have usually been held in all but the simplest type of cameras by screw mounts and in the simpler form of cameras apertures have been provided into which the objectives and their mounts were slidably moved until they reached a definite stop. The difficulties have heretofore been multiplied by the fact that glass objectives vary from a desired focal length because of the grinding operation and such lenses have to be shimmed up or the size of the mount has to be changed in order to correctly position these lenses in cameras.

In the present instance while the objectives may be of glass, our invention is chiefly directed to objective lenses made of clear acrylic resin plastic material, such as methylmethacrylate. Such lenses have a material advantage in having exactly the same focal length and thus a fixed part on the camera may be used to properly locate the objective at the correct distance from the focal plane. One object of our invention is to provide a simple camera construction in which the front wall is provided with a lens locating abutment. Another object of our invention is to provide a means for holding the objective itself against the locating abutment in order to hold and retain it in its most accurate position relative to the film. Another object of our invention is to provide a camera front which can be readily assembled by unskilled help, and in which there is but little liability of being able to incorrectly assemble an objective in assembling a camera. Still other objects will appear from the following specification, the novel features being particularly pointed out in the claims at the end thereof.

Coming now to the drawings wherein like reference characters denote like parts throughout:

The present invention is particularly directed to the proper positioning of objectives and finder lenses on cameras. Both lenses are held against rigid accurately formed parts of the camera by means of a resilient front plate. Thus there is a constant pressing of the lenses against locating members forming a part of the camera.

Figure 1:
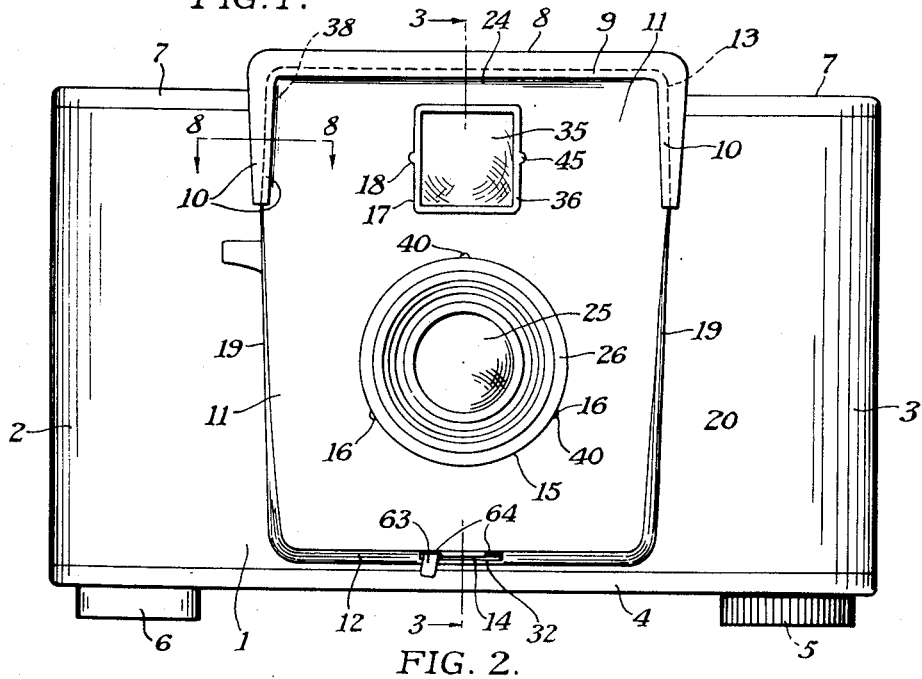
Fig. 1 is a front plan view of a typical camera which may be constructed in accordance with a preferred embodiment of our invention.
Figure 2:
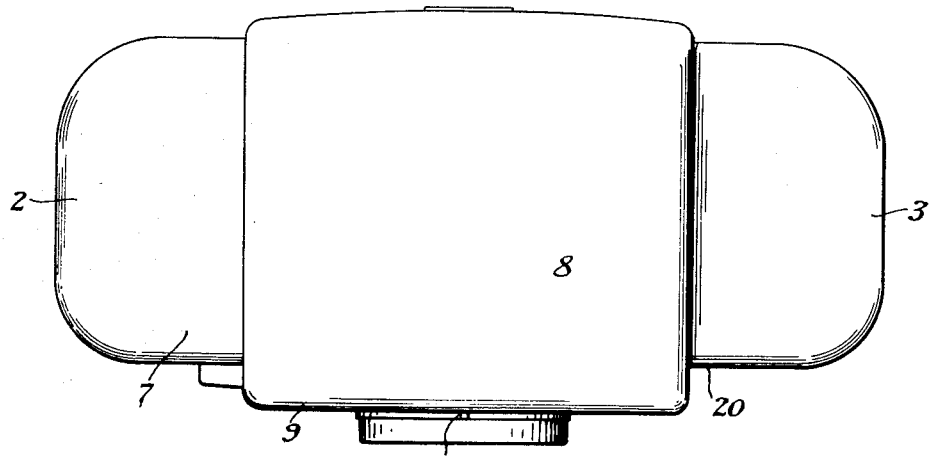
Fig. 2 is a top plan view of the camera shown in Fig. 1.

A typical camera which may be constructed in accordance with our invention is shown in Fig. 1 in which a camera body 1 is provided with a pair of outwardly extending film supply and take-up chambers 2 and 3. The camera body may include a bottom cap 4 on which there may be a winding key or knob 5 below the take-up film spool chamber 3 and a projection 6 on the opposite side of the bottom so that the camera may stand level when it is rested on a support.

Figure 3:
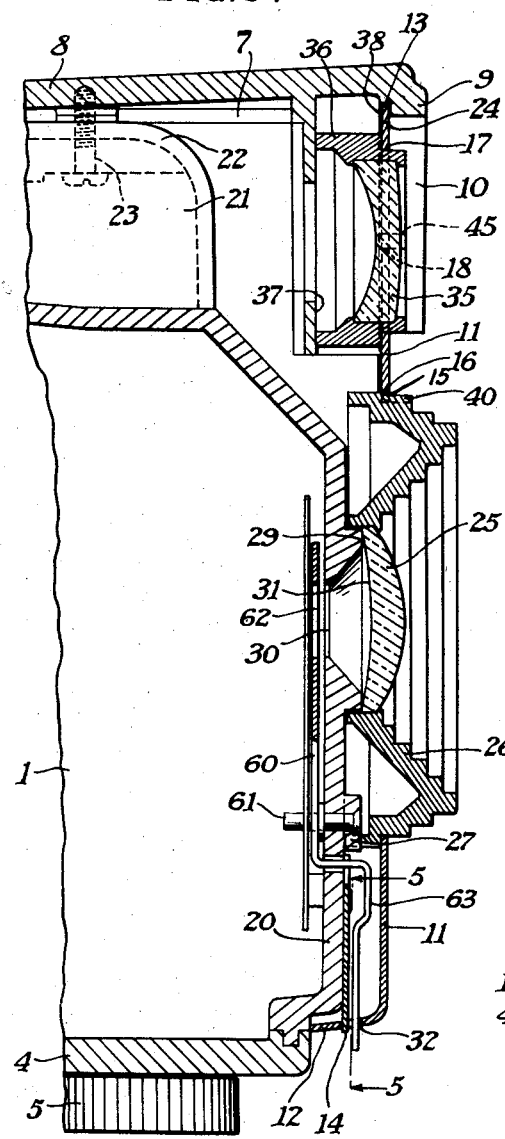
Fig. 3 is an enlarged fragmentary section through the front wall and objective of the camera shown in the preceding figures.
Figure 7:
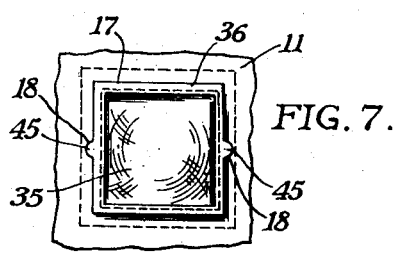
Fig. 7 is an enlarged fragmentary front view of a typical finder lens, which may be also held between the front plate and a portion of the top cap of the camera.
Figure 5:
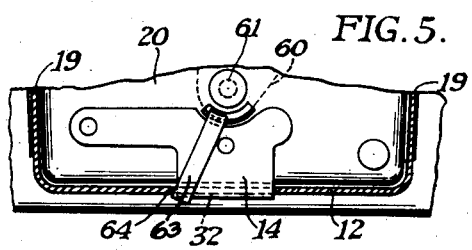
Fig. 5 is a fragmentary detail of a bottom fastening connection between the front plate and the front wall of the camera.

The camera is provided with a top cap 7 which has a raised central portion 8 and which has downwardly extending flanges 9 and 10 which may extend over the upper part of a front plate 11. The front plate 11 includes a flange 24 which may extend into a mating slot 13 in the top cap 7 of the camera as shown in Fig. 3. The bottom 12 of the front plate 11 is formed inwardly and preferably includes a slot 32 which may engage a fixed downwardly projecting flange 14 carried by a camera front wall 20 as indicated in Fig. 5. Thus, in this form of the invention the flange 14 forms a tongue entering the slot 32 of the flange 12 of the front plate 11 to hold the bottom of these two parts together.

There is a diagram plate 60 pivoted at 61 to the camera front 20 to move either of two aperatures 62 (only one being shown) into axial alignment with the objective 25. An arm 63 is bent forwardly and downwardly so that it may engage and be positioned by either of the notches 64 in the end of the slot 32 to hold a diaphragm opening in an operative position.

Figure 4:
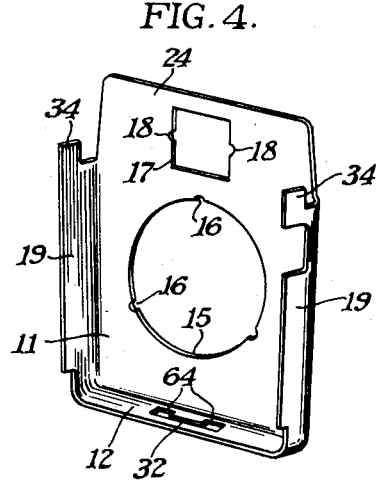
Fig. 4 is a perspective view of a front plate shown on a reduced scale, which is used in connection with the front wall of the camera to support the objective and finder lenses in an operative position.

The front plate 11 is preferably made of a resilient metal so that when mounted on the front wall 20 of the camera, it may exert a constant tension on the optical parts here shown as the objective 25 and its mount and the finder lens 35. As indicated in Fig. 4, the front plate 11 has a central aperture 15 from which a series of notches 16 extend outwardly in a generally radial direction. In addition, there is, in this instance, a square aperture 17 in the front plate which may have two or more notches 18 extending outwardly to receive the finder lens 35. Fig. 4 also shows the inwardly turned side flanges 19 of the front plate and the inwardly turned bottom flange 12, all of which engage portions of the inner front wall 20 of the camera, as indicated in Fig. 3. The inner front wall 20 carries an upstanding portion 21 and a top wall 22 through which a pair of spaced screws 23 pass into the top cap 7 to hold the camera parts together.

The main camera lens 25 is here shown as being carried by a plastic mount 26 having a shoulder 27, all of these parts being cylindrical in shape. The lens may be glass but is preferably made of a clear suitable plastic and it may be molded integrally with the mount.

The front wall 20 includes an objective locating member 29 which may be of generally cylindrical form about the exposure aperture 30. This locating member may be a flange adapted to contact with the rear concave wall 31 of the objective 25 when the objective is pressed against the cylindrical extension member 29 by means of the resiliency of the front plate 11. Thus the mount for the objective 25 is not only held in position but it presses the objective in a generally rearward direction and against the cylindrical extension 29. In a similar manner the finder lens 35 may be carried by a generally square tubular mount 36 and this mount is pressed against an extension 37 molded in the top cap portion 8 in a fixed relation to the front plate 11.

Figure 6:
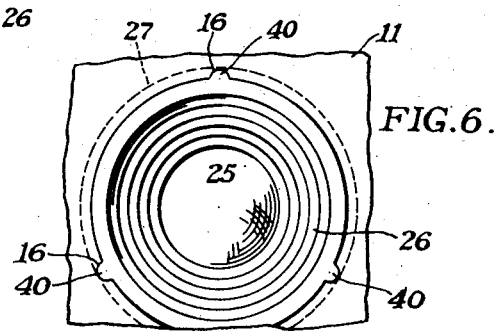
Fig. 6 is a front elevation of an objective and mount positioned in the front plate shown in Fig. 4.
Figure 8:
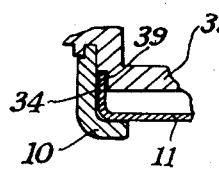
Fig. 8 is a fragmentary detail section taken on line 8—8 of Fig. 1.

In assembling the camera the means for holding the front plate 11 in place are the tongue 24 and groove 13 connections shown in Fig. 3. At the bottom of the front wall 10 of the camera raised portion 8 the side lugs 34 at the top of the rearwardly turned flanges 19 of the front plate form interengaging members between the camera and the front plate 11. The lugs 34 are best shown in Fig. 8 lying in the coacting slots 38 of the upper portion 9 above the top of the camera wall 20 and beneath the downwardly extending flanges 9 and 10 of the top cap 7 so that they are firmly held in place. The camera objective 25 is definitely attached to its supporting mount 26 as by cement or it may be integral therewith. The mount includes a number of ribs 40 which extend axially as shown in Fig. 6, these ribs being adapted to engage in closely fitting notches 16 in the front plate 11, as indicated also in Fig. 6, and have a press fit therewith. Thus, when the lens mount is pressed into the aperture 15 from the back before assembling the front plate, these lugs and notches frictionally engage to temporarily hold the objective and mount in position.

Similarly there are lugs 45 which extend axially on the finder mount 36 which engage in corresponding apertures 18 on the sides of the square aperture 17 for the finder lens. This lens 35 and its mount 36 may also be pressed into place. The lens 35 may be attached to or formed integral with the mount 36. It is understood that the fit between these lugs and apertures is merely a light press fit which will be engaged and temporarily hold the parts together so that when the camera front plate 11 is swung over the downwardly extending lug 14 and the top is placed in position against the front wall 20 of the camera by applying the top cap 7 and sliding the members 9 down over the upper edges 24 of the front plate, the parts will all be held in position and the two screws 23 may be placed in position to hold the top cap on the camera body.

The resiliency of the front plate 11 is such that it will firmly press the rear of the objective 25 against the lens locating tubular member 29 on the front wall of the camera and thereby hold the lens accurately on the axis of the focal plane. While the finder lens 35 will be similarly held in place, this lens 35 does not have to be held in as critically accurate a position as the objective. However, it has been found that with the construction described above, both these lenses are positioned and held accurately in the proper position and, moreover, that this operation can be carried out rapidly by a relatively unskilled assembler.

Figure 9:
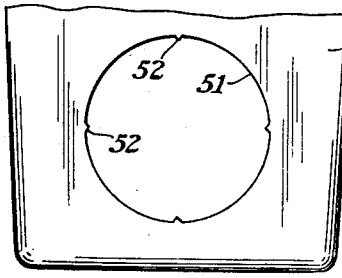
Fig. 9 is a front plan view of another form of front plate constructed in accordance with our invention.

Fig. 9 shows a slight variation in the type of connection between the plastic lens mount and the front plate. Here the front plate 50 is provided with an aperture 51 which closely fits the flange 27 of the objective mount as shown in Fig. 3. The objective mount may, however, be pressed over four very minute points 52 in this embodiment of our invention, these points being only sufficient to scratch slightly into the plastic parts and position them so that the camera front may be assembled. However, the front plate 50 is still a resilient plate and regardless of the engagement of the points 52 with the lens mount, it will firmly press the lens mount until the objective 25 is pressed against the tubular lens locating member 29 of the camera front 20. In this instance the lens mount is made of concentric rings and no lugs similar to the lugs 40 are required.

While we have described several forms showing preferred embodiments of our invention, it is obvious that other forms will readily occur to one skilled in the art. We consider as within the scope of our invention all such forms as may come within the scope of the appended claims.

We claim:

1. A camera construction comprising, in combination, a camera body, a front wall included in the body, an objective locating abutment on the front wall comprising a cylindrical member, a top cap included in the camera body including a grooved top wall and a pair of spaced grooved side walls extending only part way down the camera front wall, a resilient front plate including an opening to receive and to be located by the objective locating abutment, the bottom wall of the front plate including a slotted, inwardly turned flange engaging the camera front, a lug carried by the front wall engaging the slotted flange of the front plate to hold the front plate to the front wall, the side walls of the front plate including inwardly turned flanges having lugs thereon, coacting grooves in the camera front wall engaged by the lugs to hold the inturned side flanges against the front wall, the upper edge of the front plate engaging the grooved top wall and side walls of the top cap to hold the front plate to the top cap, and an objective and mount located on the camera front wall by the cylindrical member, the objective being resiliently pressed thereagainst by the resilient front plate.

2. The camera construction of claim 1 characterized in that there are radially extending ribs integral with the objective mount to frictionally engage similarly spaced notches in the front plate to hold the parts in contact.

3. The camera construction of claim 1 characterized in that the objective has a curved surface engaging the lens locating abutment, and in that a finder lens and its mount engage a locating abutment on the camera front, the resilient front plate resiliently holding both lenses in position on the locating abutments on the camera front.

4. The camera construction of claim 1 characterized in that the objective has a curved surface engaging the lens locating abutment, and in that a finder lens and its mount engage a locating abutment on the camera front, the resilient front plate resiliently holding both lenses in position on the locating abutments on the camera front, the camera objective and finder lens mounts each including means integral therewith coacting with apertures in said resilient front plate for attaching the lenses on said plate.

5. The camera construction of claim 1 characterized in that the objective has a curved surface engaging the lens locating abutment, and in that a finder lens and its mount engage a locating abutment on the camera front, the resilient front plate resiliently holding both lenses in position on the locating abutments on the camera front, the camera objective and finder lens each including means coacting with the resilient front plate for holding the lenses in position, the means comprising lugs and lug engaging members integral with the lens mounts and resilient front plate for frictional engagement.

References Cited in the file of this patent

UNITED STATES PATENTS

| | | |
|---|---|---|
| 1,239,017 | Kroedel | Sept. 4, 1917 |
| 1,548,116 | Christie | Aug. 4, 1925 |
| 2,664,799 | Wilkinson | Jan. 5, 1954 |